United States Patent [19]
Pietrelli et al.

[11] 3,818,579

[45] June 25, 1974

[54] METHOD AND DEVICE FOR PIVOTALLY MOUNTING A MOTOR VEHICLE ON A SUPPORTING FRAME

[76] Inventors: Giuseppe Pietrelli; Carlo Pucci, both of Piazza Betti n. 46, Marina Di Massa, Italy

[22] Filed: Feb. 5, 1973

[21] Appl. No.: 329,363

[30] Foreign Application Priority Data
June 12, 1972 Italy ................................. 68873-72

[52] U.S. Cl. .................... 29/559, 29/200 P, 29/401
[51] Int. Cl. ....... B23q 7/00, B23p 7/00, B23p 19/00
[58] Field of Search .......... 29/200 P, 400, 401, 559, 29/200 J

[56] References Cited
UNITED STATES PATENTS
| | | | |
|---|---|---|---|
| 3,466,723 | 9/1969 | Durand | 29/200 P |
| 3,705,679 | 12/1972 | Tenpas | 29/200 P |

Primary Examiner—Thomas H. Eager

[57] ABSTRACT

A method and device for pivotally mounting a motor vehicle on a supporting frame of a motor vehicle lift bench so that the motor vehicle can be tilted or rotated to permit access to the underside of the motor vehicle for repairing or checking parts thereof, the motor vehicle being rotated about a fulcrum formed by front and rear mounting means carried by the supporting frame.

8 Claims, 9 Drawing Figures

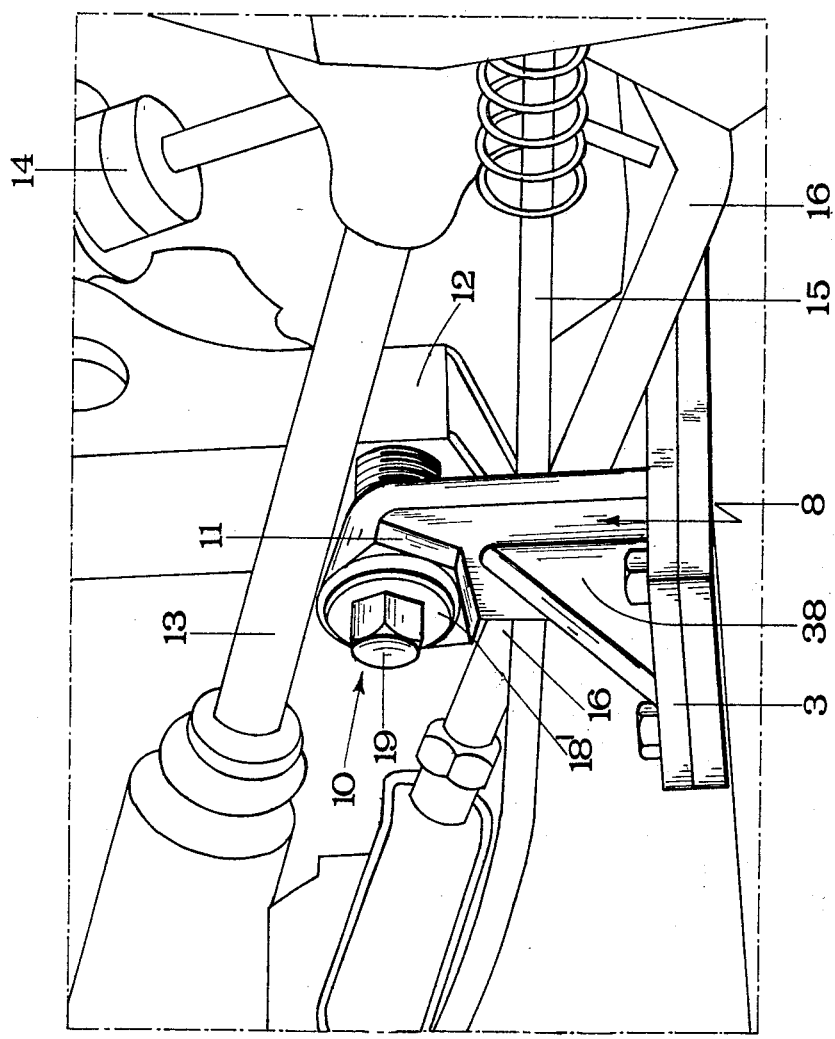

METHOD AND DEVICE FOR PIVOTALLY MOUNTING A MOTOR VEHICLE ON A SUPPORTING FRAME

This invention relates to a method and device for pivotally mounting a motor vehicle on a supporting frame for repairing or checking parts of the motor vehicle.

For repairing and checking damaged motor vehicle bodies, motor vehicle lift benches are known which essentially comprise a rectangular supporting frame having two longitudinal beams and a pair of transverse end beams, at least two intermediate parallel transverse beams being mounted for sliding movement along the longitudinal beams and carrying means for connection to or checking of mechanical parts of the motor vehicle or certain parts of the motor vehicle body.

After connection of the motor vehicle to the intermediate transverse beams work is done directly on the damaged parts of the motor vehicle body or chassis to bring them back into their original shape. This work is generally carried out with the aid of pressure fluid actuated means such as hydraulic or pneumatic rams which are operated until the damaged parts engage the abutment and check means previously secured to the intermediate transverse beams of the supporting frame.

Particularly when complicated repair work is to be carried out and exact checks are to be made a great number of such abutment and check members are required which obstruct the repair work and make it difficult to fit the hydraulic rams on the parts to be repaired or straightened so that it is advisable to carry out repairs by steps.

It is therefore an object of the present invention to permit repairs to be carried out by steps by providing a method and device for pivotally mounting the motor vehicle on the supporting frame so that parts of the motor vehicle located on the underside thereof are easily accessible and work to be carried out below the motor vehicle on the supporting frame is facilitated.

The known constructions have the disadvantage that access to the portions of the motor vehicle located on the underside thereof can only be obtained after lifting the motor vehicle lift bench and thus the supporting frame. However, it is difficult to work with the abutment members below the motor vehicle when the latter is secured to the supporting frame. On the contrary, it is easy to work with the abutment members below the motor vehicle when the latter is detached, even if only partly, from the supporting frame.

The main feature of the method proposed by the present invention for mounting a motor vehicle on a supporting frame consists in that the motor vehicle in the assembled condition, or with some of its mechanical parts dismantled, is pivotally mounted in such a manner that it can be rotated clockwise or anticlockwise about a fulcrum formed by front and rear mounting means carried by the supporting frame and adapted to engage parts of the motor vehicle.

According to another feature of the present invention pivotal mounting of the motor vehicle relative to the supporting frame is obtained by pivotal turning of pairs of said mounting means secured to the supporting frame in the vicinity of the front and/or rear portions thereof, around one of two pairs of bolts for securing said mounting means to said supporting frame, after having removed the other pair of bolts. Rotation of the motor vehicle about its transverse axis in an anticlockwise direction may be obtained, for example, by supporting the motor vehicle on the front mounting means and temporarily removing a pair of the bolts serving to secure the mounting means to the longitudinal beams of the supporting frame. Rotation of the motor vehicle about its transverse axis in a clockwise direction may be obtained, for example, by supporting the motor vehicle on the rear mounting means and temporarily removing a pair of the rear bolts serving to secure the mounting means to the longitudinal beams of the supporting frame. Thus, such rotation takes place about an axis extending at right angles to the longitudinal beams and formed by a series of said bolts.

According to another feature of the invention the vehicle mounting means is provided with holes and secured laterally to the longitudinal beams of the supporting frame by at least two through bolts for each of said mounting means, said longitudinal beams being provided with holes corresponding to the holes in the mounting means, said mounting means including mounting brackets adapted to be pivotally and adjustably connected to a part of the motor vehicle to be clamped, means being provided for lifting the motor vehicle at its end opposite said mounting means and for rotating the motor vehicle about an axis extending transversely of the motor vehicle through said mounting means.

Some preferred embodiments of the invention will now be described by way of example and with reference to the accompanying drawings, in which:

FIG. 1 is a schematic perspective view of a device as proposed by the present invention, shown with a motor vehicle to be lifted in front and rotated in an anticlockwise direction by the proposed method about an axis formed by a bolt of the rear mounting means, said bolt being screwed down on a part of the motor vehicle, the motor vehicle being shown in thin lines whereas the parts of the device forming part of the present invention are shown in heavy lines;

FIG. 9 is a perspective view similar to FIG. 8, but showing the front mounting means in the clamped position.

Figure 1:
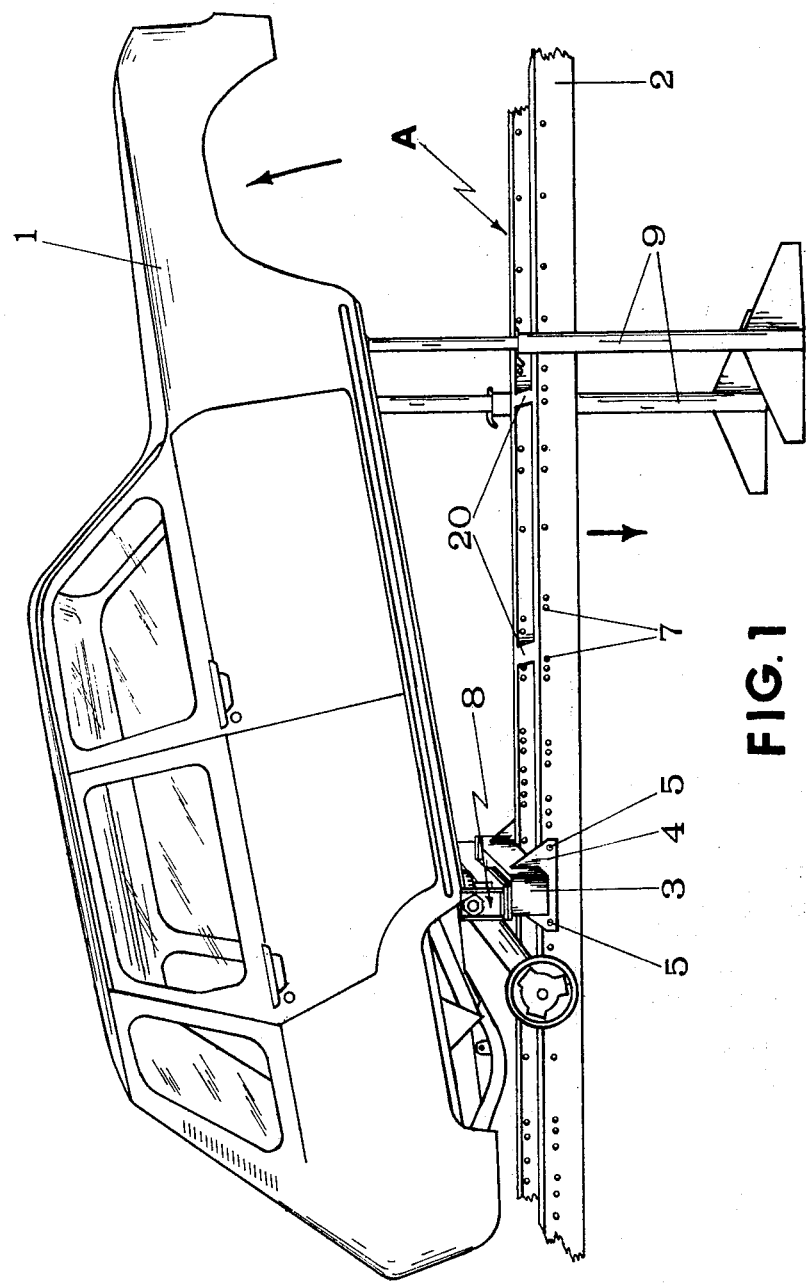

Referring to the drawings, particularly to FIG. 1, there is shown a motor vehicle 1 supported by removable and adjustable crosspieces 3 adapted to be mounted in selected positions on longitudinal beams 2 firmly connected to one another by transverse beams 20 to form a supporting frame A of a motor vehicle lift bench. The crosspieces 3 are removably secured to the longitudinal beams 2 by connecting plates 4 having inclined upper edges and welded or somehow firmly secured to the crosspieces 3. However, the connecting plates 4 are detachably secured to the longitudinal beams 2 by means of through bolts 5. In the illustrated embodiment there are two bolts 5 in each connecting plate 4, but obviously there may be more bolts in each connecting plate. However, for the purpose of the present invention at least two bolts 5 are required. The bolts 5 extend through holes 6 (FIG. 2) in the connecting plates 4 and holes 7 extending transversely through the longitudinal beams 2 in the vicinity of their upper edges.

Each of the crosspieces 3 carries at either end thereof a mounting bracket 8 extending upwardly from the crosspiece 3 and carrying means adapted to be brought into pivotal and adjustable engagement with a part of the motor vehicle, preferably the vehicle body, to permit a limited rotation of the motor vehicle about a transverse axis passing through said engaging means.

FIGS. 5 to 8 show one embodiment of such engaging means designed to be brought into engagement with the rear portion of the motor vehicle. In this embodiment the mounting bracket 8 has a pair of side flanges 28 connected by a central web 18. A hole is provided in the central upper portion of the central web 18 and receives a threaded bolt 10 of relatively large dimensions such as to be able to carry at least a substantial portion of the weight of a motor vehicle. The threaded bolt 10 screws into a nut 11 held between the side flanges 28 of the mounting bracket 8. Formed integrally with the outer end of the threaded bolt 10 is a nut 19 of a diameter smaller than that of the threaded shank of the bolt 10 and of a size such that it can be engaged and turned by a screw wrench of a normal standard size. A collar 18 of a diameter larger than that of the threaded shank of the bolt 10 is provided on the latter adjacent the nut 19 to limit the degree of penetration of the bolt 10 into the nut 11.

Figure 5:
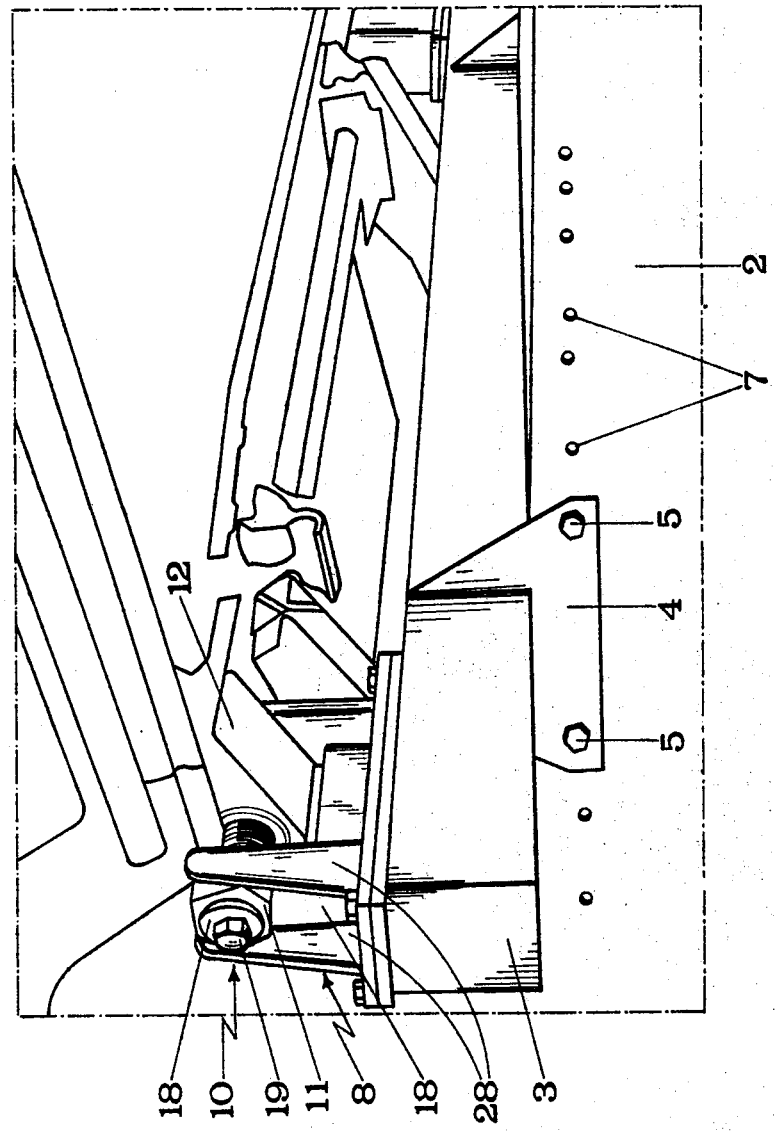
FIG. 5 is a perspective view showing the rear mounting means of FIG. 1 on a larger scale.
Figure 6:
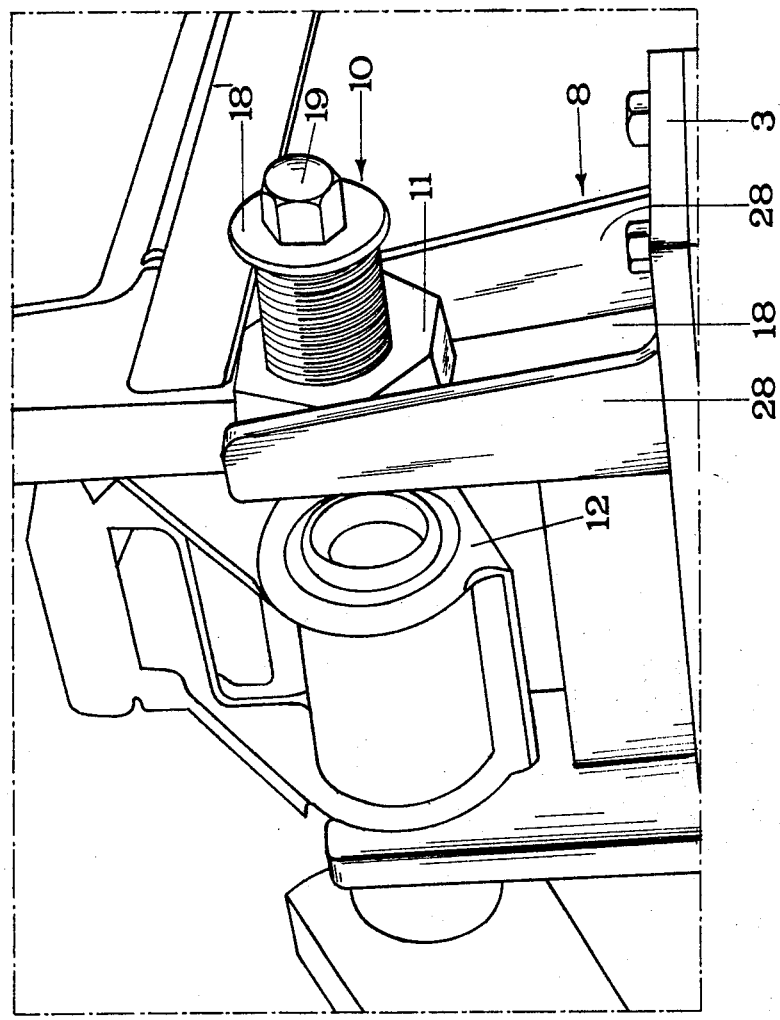
FIG. 6 is a perspective view similar to FIG. 5 but showing the rear mounting means as seen obliquely from the rear in the position before clamping part of the motor vehicle.
Figure 7:
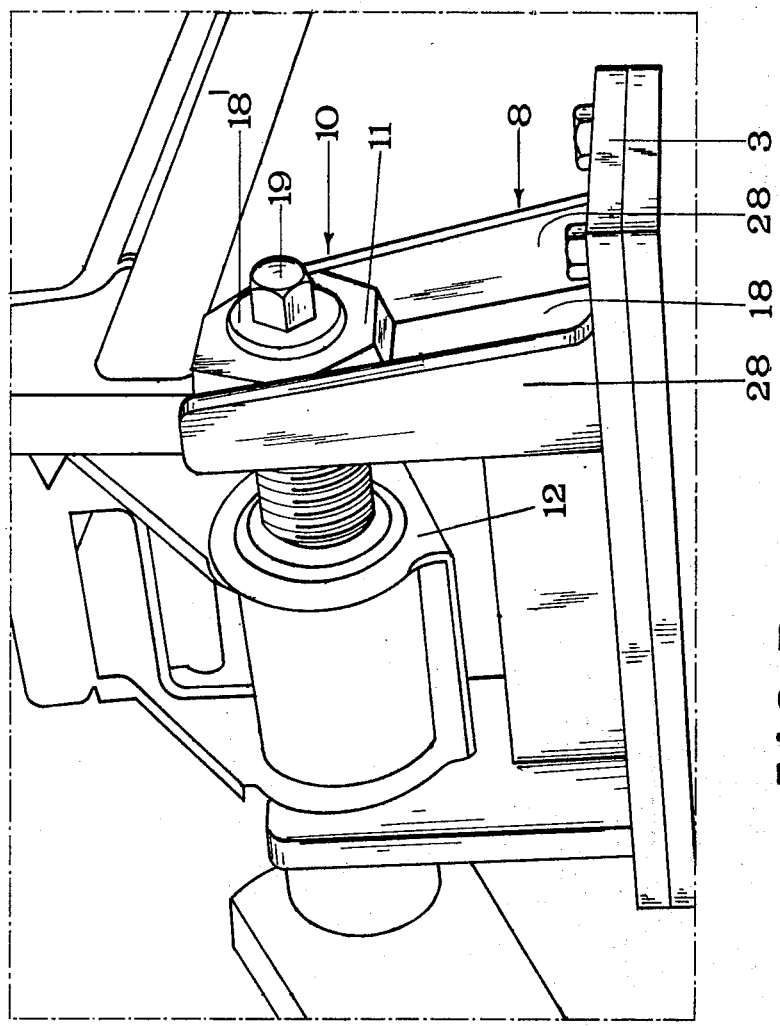
FIG. 7 is a perspective view similar to FIG. 6, but showing the rear mounting means in the clamped position.

The end of the bolt 10 opposed to the nut 19 is adapted to engage a part of the motor vehicle to be clamped and rotated. For repairing, for example, a damaged car body this part would be a part 12 of the car body as shown in FIGS. 5 to 7. In this example of application of the device the part 12 is a spring shackle firmly connected to the car body and normally pivotally connected to one end of the suspension leaf springs of the car. FIG. 5 shows the spring shackle 12 obliquely from the front while FIGS. 6 and 7 show it obliquely from the rear. FIG. 6 shows the threaded bolt 10 in the position before clamping the spring shackle 12 whereas FIGS. 5 and 7 show the threaded bolt 10 completely screwed down to engage the spring shackle 12. In this latter position the car is pivotally connected to the supporting frame of the car lift bench and can be lifted at its front end, pivoting about the threaded bolt 10 as an axis of rotation.

Figure 8:
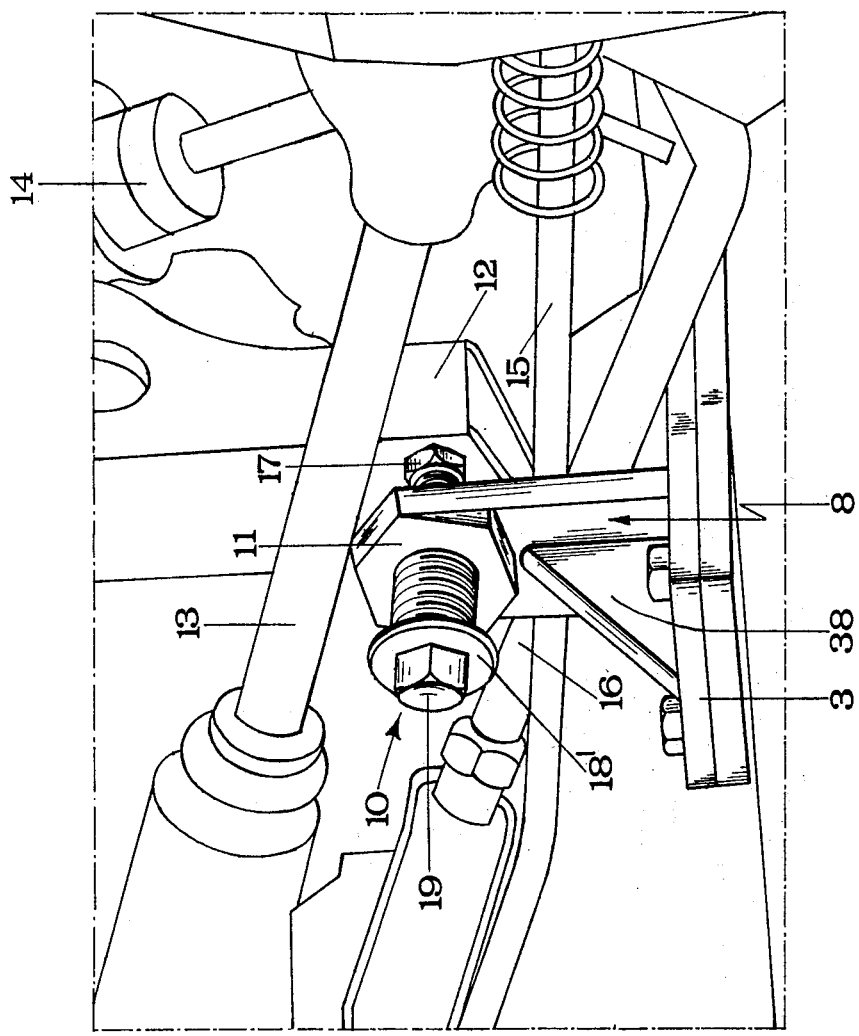
FIG. 8 is a perspective view showing the front mounting means of FIG. 3 on a larger scale, in the position before clamping a part of the motor vehicle.

FIGS. 8 and 9 show an embodiment of the vehicle engaging means designed to be brought into engagement with the front portion of the motor vehicle. In this embodiment the mounting bracket 8 has the form of an upstanding plate extending vertically from and transversely of the crosspiece 3. On the side of the mounting bracket 8 remote from the side where the vehicle is to be clamped this mounting bracket 8 is reinforced by a triangular bracing plate 38 formed integrally with or firmly secured to both the mounting bracket 8 and the crosspiece 3 to assist the mounting bracket 8 in resisting to the force exerted by the motor vehicle when it is clamped to the supporting frame. The threaded bolt 10 shown in FIGS. 8 and 9 is similar to that shown in FIGS. 5 to 7 except that it is recessed at its end opposed to the nut 19, the diameter of this recess being greater than the largest diameter of a nut 17 on the part 12 of the motor vehicle to be clamped, the part 12 extending vertically downwardly from the bottom of the motor vehicle body.

FIG. 8 shows the vehicle engaging means before clamping of the motor vehicle to the supporting frame A of the motor vehicle lift bench whereas FIG. 9 shows the vehicle engaging means in the position of clamping the motor vehicle in which the threaded bolt 10 is completely screwed down into engagement with the part 12 of the motor vehicle. In this position the motor vehicle can be lifted at the rear by pivoting about the threaded bolt 10 connected to the front portion of the motor vehicle.

The other parts of the motor vehicle also shown in FIGS. 8 and 9 such as a transmission gear shaft 13, wheel shock absorber 14, suspension spring connecting rod 15 and steering connecting rod 16 do not form part of the present invention and have been indicated only to illustrate the position of the part 12 of the motor vehicle to be clamped and the location in which the mounting bracket 8 is applied.

Reverting to FIGS. 1 to 4 there is also shown a trestle 9 which is placed below the part of the vehicle to be lifted. The trestle 9 may also be replaced by a hydraulic or pneumatic lifting ram, car jack or the like. However, normally the method proposed by the present invention is carried out in the following manner:

The motor vehicle is placed in the assembled condition, or with some of its parts dismantled, as shown in FIGS. 1 to 4, on the supporting frame A of the motor vehicle lift bench. Then the trestle 9 is placed below the part of the vehicle which is to be lifted, for example, the front part of the vehicle. After that the rear part of the vehicle is firmly connected to the mounting brackets 8 by screwing down the threaded bolts 10 to such an extent as to firmly engage the part 12 of the vehicle to be clamped but still allow for pivotal movement of the vehicle about the axis formed by the threaded bolts 10 (FIGS. 1 and 7).

Figure 2:
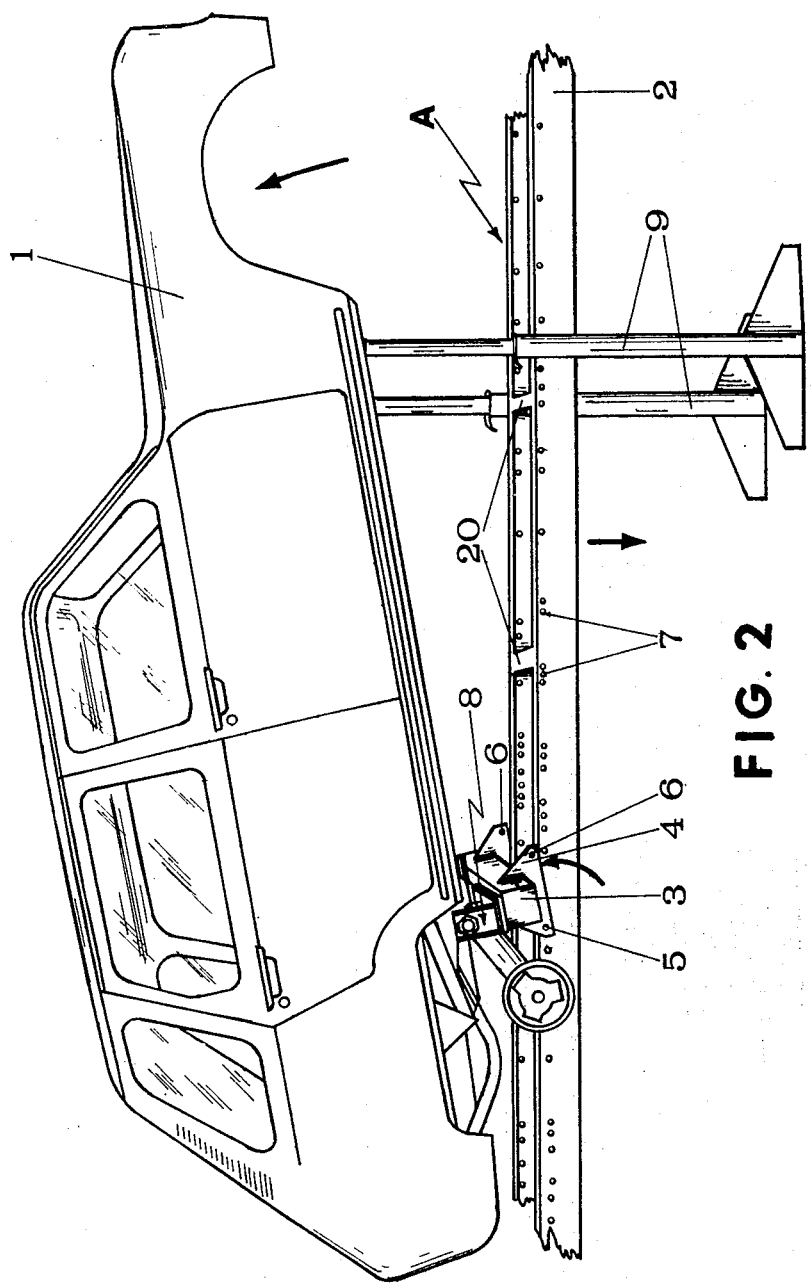
FIG. 2 is a schematic perspective view similar to FIG. 1, showing the same device as used for rotation of the motor vehicle in an anticlockwise direction about an axis formed by a bolt of the rear mounting means which is normally used to secure said rear mounting means to longitudinal beams of the supporting frame.

In the modification of the method shown in FIG. 2, the threaded bolts 10 are firmly screwed down on the part 12 of the vehicle so as to prevent any relative movement between the threaded bolts 10 and the part 12 of the vehicle. Then the bolt or bolts 5 are removed so as to leave only one bolt 5 to work as an axis of rotation for pivotal movement of the vehicle.

Then in both forms of carrying out the method the supporting frame A is lowered by lowering the car lift bench. By lowering the car lift bench to a certain extent the front portion, or in the embodiments shown in FIGS. 3 and 4, the rear portion of the vehicle remains supported at a certain height above the supporting frame A on the trestle 9 allowing free access to the underside of the vehicle. For returning the vehicle to its initial position on the supporting frame A the operations described above are repeated in the inverse order.

Figure 3:
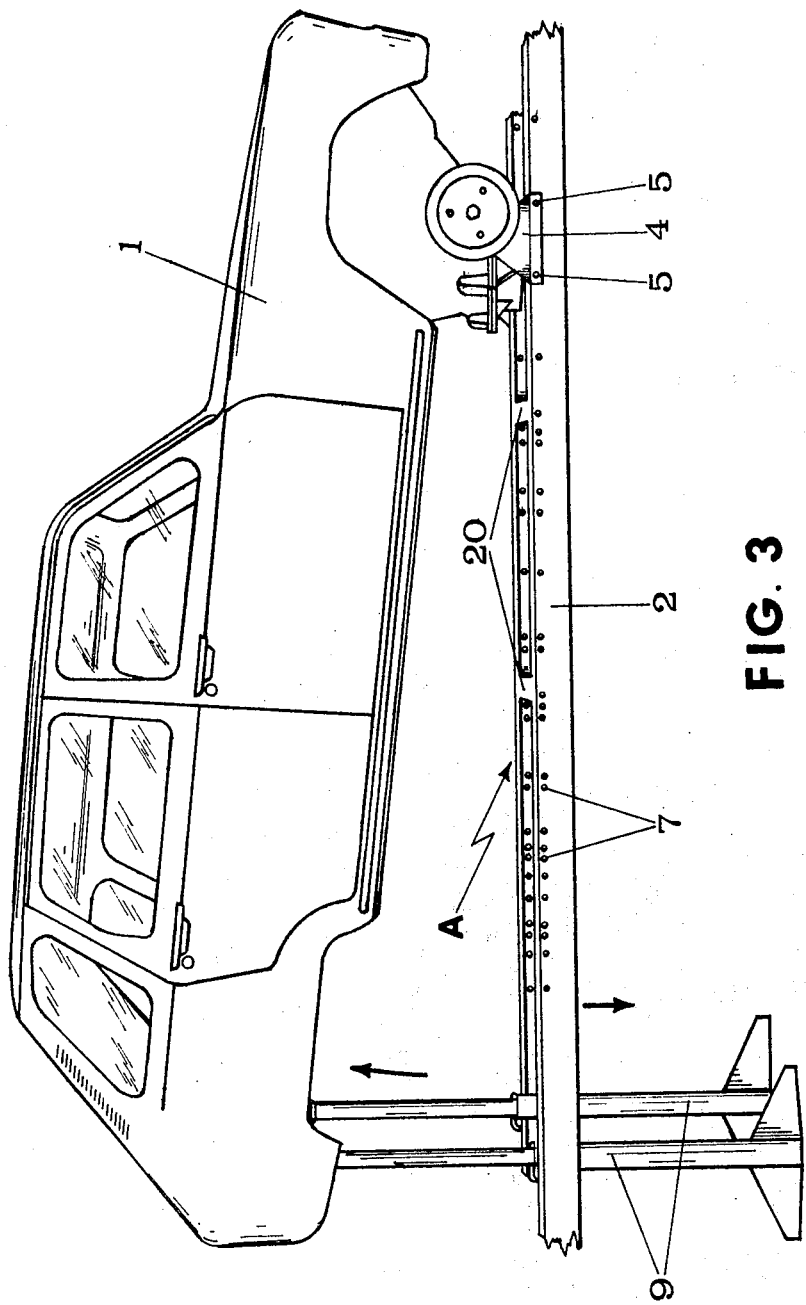
FIG. 3 is a similar schematic perspective view as in FIGS. 1 and 2, but showing the device applied to a front portion of the motor vehicle for lifting the rear portion thereof about an axis of rotation formed by a bolt of the front mounting means, said bolt being screwed down on a part of the motor vehicle.
Figure 4:
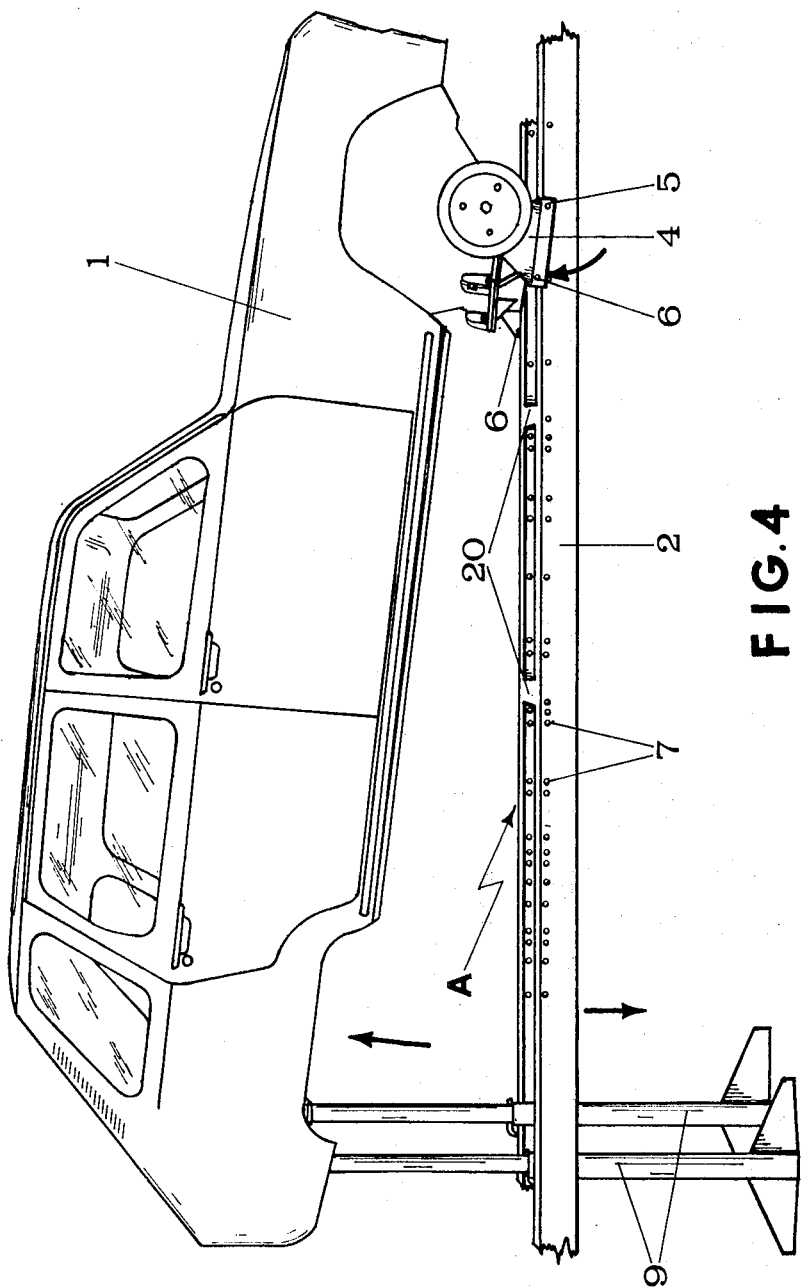
FIG. 4 is a schematic perspective view similar to FIG. 3, but showing the device as used for lifting the rear portion of the motor vehicle about an axis of rotation formed by a bolt of the front mounting means which is normally used to secure said front mounting means to the longitudinal beams of the supporting frame.

For lifting the rear portion of the vehicle as shown in FIGS. 3 and 4 the same procedure is used by clamping the mounting bracket 8 on a part 12 in the front portion of the vehicle as shown in FIGS. 8 and 9. When using a hydraulic or pneumatic ram or car jack instead of the trestle 9 lifting of the front or rear portion of the vehicle is effected by the ram or car jack instead of lowering the car bench as described above. The supporting frame A may be provided with front or rear mounting means as described or with both front and rear mounting means. In all described embodiments the motor vehicle when lifted is held in a perfectly centered horizontal position.

Although some preferred embodiments of the invention have been described herein with reference to the accompanying drawings it is to be understood that the invention is not limited to these precise embodiments and that numerous changes and modifications may be made therein without departing from the scope of the invention. Particularly the vehicle mounting means may also be arranged on a transverse beam of the vehicle supporting frame instead of a longitudinal beam, as shown, to permit a vehicle to be tilted or rotated about an axis extending longitudinally through the vehicle.

We claim:

1. A device for mounting a motor vehicle on a supporting frame, comprising mounting means secured laterally to longitudinal beams of the supporting frame by at least two through bolts for each of said mounting means, said longitudinal beams being provided with holes corresponding to holes in said mounting means, said mounting means being pivotally and adjustably connected to a part of the motor vehicle to be clamped, and means for lifting the motor vehicle at its end opposite said mounting means and for rotating the motor vehicle about an axis extending transversely of the motor vehicle through said mounting means.

2. A device as claimed in claim 1, wherein said mounting means comprise mounting brackets extending upwardly from a removable and adjustable crosspiece adapted to be mounted in selected positions by means of connecting plates on said longitudinal beams and a threaded bolt adapted to be brought into engagement with the part of the motor vehicle to be clamped extends transversely through said mounting brackets, said axis of rotation extending transversely of the motor vehicle being formed by said threaded bolt.

3. A device as claimed in claim 1, wherein said axis of rotation extending transversely of the motor vehicle is formed by a series of said through bolts aligned transversely of the motor vehicle with the remaining through bolts removed.

4. A method of mounting a motor vehicle on a supporting frame, in which the motor vehicle in the assembled condition, or with some of its mechanical parts dismantled, is pivotally mounted in such a manner that it can be rotated in opposite directions about a transverse axis passing through front and rear mounting means carried by the supporting frame and adapted to engage parts of the motor vehicle, characterized in that said pivotal mounting of the motor vehicle relative to the supporting frame is obtained by pivotal turning of pairs of said mounting means, secured to the supporting frame in the vicinity of the front and rear portions thereof, around one of two pairs of bolts after having removed the other pair of bolts.

5. A method as claimed in claim 4, wherein the motor vehicle is rotated counterclockwise about its transverse axis by supporting the motor vehicle on the mounting means at the front portion of the supporting frame and temporarily removing a pair of bolts used to secure said mounting means to longitudinal beams of the supporting frame to permit rotation of the motor vehicle about an axis extending at right angles to said longitudinal beams, said axis being coincident with the axes of a series of said bolts aligned transversely of the supporting frame.

6. A method as claimed in claim 4, wherein the motor vehicle is rotated clockwise about its transverse axis by supporting the motor vehicle on the mounting means at the rear portion of the supporting frame and temporarily removing a pair of bolts used to secure said mounting means to longitudinal beams of the supporting frame to permit rotation of the motor vehicle about an axis extending at right angles to said longitudinal beams, said axis being coincident with the axes of a series of said bolts aligned transversely of the supporting frame.

7. A method of mounting a motor vehicle on a supporting frame, in which, the motor vehicle in the assembled condition, or with some of its mechanical parts dismantled, is pivotally mounted in such a manner that it can be rotated in opposite directions about at least two transverse axes, a first passing through front and the second through rear mounting means, respectively, at front and rear end portions of the supporting frame, each mounting means being adapted to engage parts of the motor vehicle, characterized by pivotally mounting one end of the motor vehicle on the supporting frame of a motor vehicle lift bench for rotation about one of said axes, supporting the end of the motor vehicle remote from the pivotally mounted end on a tressel, and lowering the motor vehicle lift bench to cause said end of the motor vehicle supported by said tressel to be lifted.

8. A method of mounting a motor vehicle on a supporting frame, in which the motor vehicle in the assembled condition, or with some of its mechanical parts dismantled, is pivotally mounted in such a manner that it can be rotated in opposite directions about at least two transverse axes, a first passing through front and the second through rear mounting means respectively at front and rear end portions of the supporting frame, each mounting means being adapted to engage parts of the motor vehicle, characterized in that said pivotal mounting of the motor vehicle relative to said supporting frame is obtained by engaging one of two pairs of bolts, forming part of the mounting means, with a part of the motor vehicle in the vicinity of one of the portions of the supporting frame, said motor vehicle being pivoted about one of said two pairs of bolts when an end of the motor vehicle remote from the pivoted end is raised or lowered.

* * * * *